UNITED STATES PATENT OFFICE.

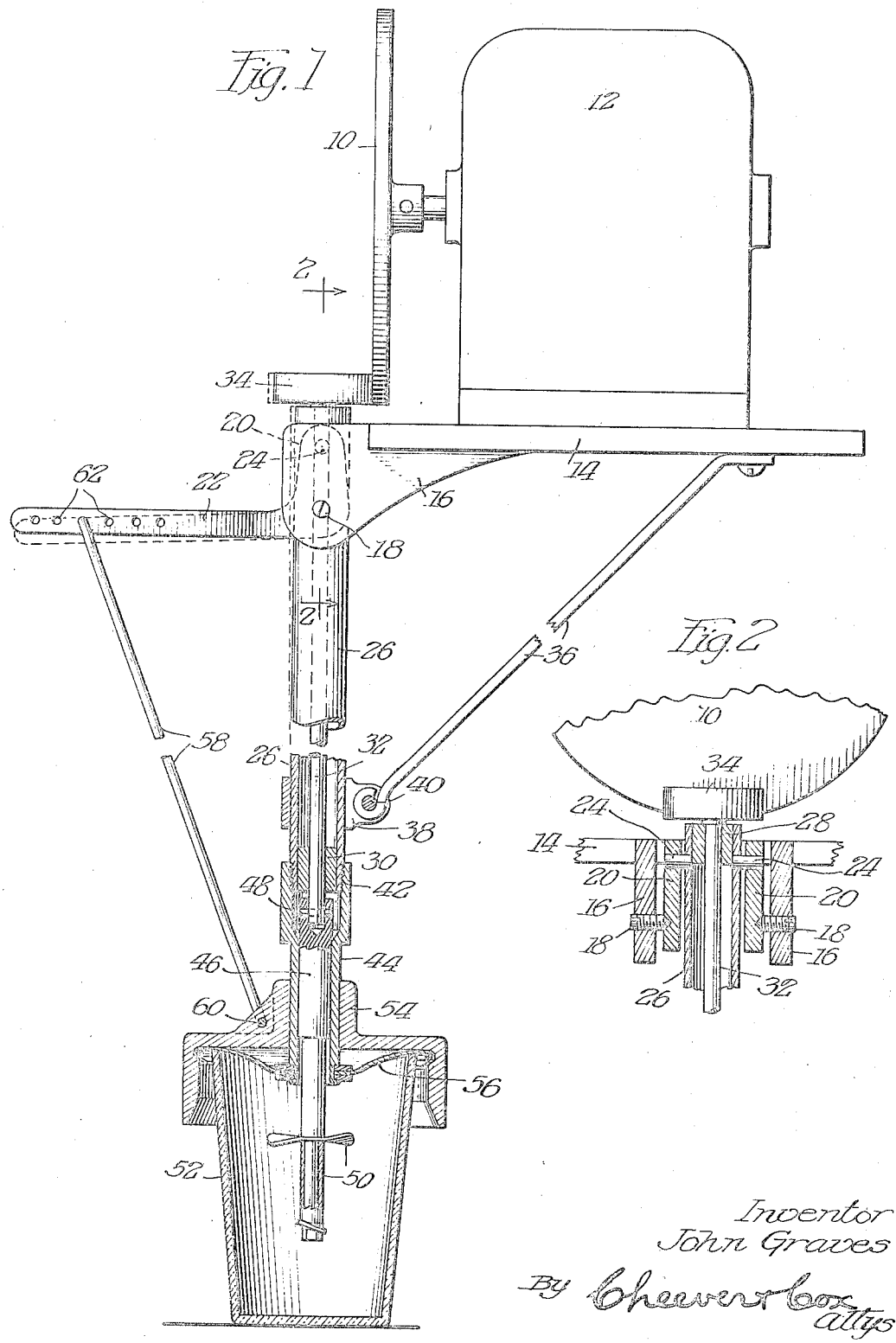

JOHN GRAVES, OF MADISON, WISCONSIN, ASSIGNOR TO FRENCH BATTERY & CARBON CO., OF MADISON, WISCONSIN, A CORPORATION OF WISCONSIN.

MIXING-MACHINE.

1,351,243.  Specification of Letters Patent.  Patented Aug. 31, 1920.

Application filed February 21, 1919. Serial No. 278,357.

*To all whom it may concern:*

Be it known that I, JOHN GRAVES, a citizen of the United States, residing at Madison, in the county of Dane and State of Wisconsin, have invented a certain new and useful Improvement in Mixing-Machines, of which the following is a specification.

This invention relates to machines for mixing liquid materials, such for instance as ingredients of ordinary ice cream soda water, or the ingredients required in an electric battery.

The object of the invention is to provide an exceedingly speedy machine in which those parts which the operator comes into contact with are mechanical as distinguished from electrical, so as to do away with the danger of shocks to the operator common with devices now on the market, and in which no part of a solution mixed by it can, under ordinary circumstances, come in contact with the operating parts of the device, thus doing away with the destructive corrosive effects common with machines in the prior art.

The invention consists in mechanism capable of carrying out the above and other objects, which can be easily and cheaply made, which is satisfactory in operation and is not readily liable to get out of order. More particularly, the invention consists in the features and details of construction hereafter more fully set forth in the specification and claims.

Referring to the drawings in which given numerals indicate the same parts throughout the several views, Figure 1 is an elevation, partly in section, showing mechanism illustrating this invention in its preferred form.

Fig. 2 is a sectional detail view on the line 2—2, of Fig. 1.

The power for operating the mechanism of this invention is provided by a continuously rotating flat disk 10, mounted considerably above the working position of the operator of the device and driven by any suitable source of power, as for instance an electric motor 12 mounted on a shelf 14. On the front of this shelf 14 is secured by any suitable means a bracket 16 in which is pivoted at 18 a bell crank lever having a shorter bifurcated vertical arm 20 and a longer horizontal arm 22. Between the branches of arm 20 and pivoted thereto on pins 24 is a vertical tubular casing 26 carrying at its upper end a bearing 28 and at its lower end a bearing 30 within which a vertical shaft 32 is journaled. On the upper end of this shaft 32 is rigidly secured a horizontal wheel 34 adapted to be throw into and out of frictional contact with the wheel 10 as the bell crank 20—22 is rocked backward and forward between the dotted and full line positions of Fig. 1. The casing 26 is supported from the underside of table 14 to permit such rocking movement through the agency of a brace rod 36 and a coller 38, supporting the tube 26 and pivoted to rod 36 at 40.

Adjustably secured on the casing 26 by screw threads 42 is supplemental casing member 44 within which is journaled a vertical shaft 46 driven by rod 32 through a flexible or a universal joint 48 so that members 32 and 46 are to all intents and purposes one shaft. Extending from the lower end of shaft 46 is a stirring tool 50 entering the glass 52 or other receptacle within which the mixture to be operated upon is to be placed. Slidable vertically upon tubular member 44 is a cover member 54 adapted to, as shown, inclose the top of glass 52 through the agency of a rubber or other sealing plate 56, conveniently placed within this cover.

Longer arm 22 of the bell crank is connected to cover 54 through a rod 58 attached to the cover on a fixed pivotal axis 60 and selectively adjustable along the lever arm 22 in the holes 62 in the obvious manner.

In the absence of an operator and the glass 52, the weight of the cover 54 and rod 58 causes these parts to descend by gravity sufficiently to move wheel 34 to the dotted line position where it is out of engagement with rotating wheel 10. When, now an operator comes along with a glass 52 or other receptacle containing materials to be mixed, he or she merely places the glass in the position shown in the drawing and presses it upward so as to move cover 52, rod 58 and lever arm 22 upward a sufficient distance to move wheel 34 over into engagement with wheel 10. While the parts are in this position the motion of wheel 10 is transmitted to wheel 34, to rod 32, to shaft 46 and to operating tool 50. The minute the operator for any reason releases the hold upon glass 52, the cover 54 and attached parts descend by gravity and stops the machine in the manner described.

From the foregoing it will be seen that the machine never operates except when the glass 52 is pressed against the cover 54 and is therefore sealed, and that therefore the contents of the glass can never get out into contact with the operating parts of the machine during the stirring operation. Furthermore, the glass is at the farthest extremity of the machine from the electric motor 12 and the operator does not have to touch the motor or a switch operating it to conduct the stirring operation, so all danger of actual shock is removed and the well known factory inefficiency due to fear of electric shock in such machines is entirely removed. The tubular member 26 forms a casing inclosing and protecting the shaft 32—46 from danger of the operator being caught thereon while it is rotating. There are therefore, no moving parts accessible by the operator between the wheels 10 and 34 which are out of the operator's reach and the stirring tool 50 which never operates except when inclosed with a receptacle 52.

Having thus described my invention, what I claim as new and desire to secure by Letters Patent, is:—

1. In mechanism of the class described, a continuously moving power member, a second power member adapted to be temporarily moved into engagement with said continuously moving power member, a stirring member driven by the second power member, a cover member adapted to close a receptacle detachably applied to the stirring member for the purpose of having it operate in said receptacle, and mechanism connecting the cover member to the second power member adapted, when the cover is pressed by such a receptacle containing material to be stirred to throw the second power member into engagement with the first, and otherwise hold it out of such engagement.

2. In mechanism of the class described, a continuously rotating power member, a second power member adapted to selectively engage the first, a shaft driven by the second power member, a stirring member on said shaft, a bell crank device capable of throwing the second power member into and out of engagement with the first power member, a cover for a receptacle whose contents is to be stirred concentric with and slidable lengthwise of said shaft, a connection between said cover member and said bell crank mechanism adapted, as the cover is moved, to throw the second power member into and out of engagement with the first.

3. In mechanism of the class described, a continuously rotating power member, a second power member adapted to selectively engage the first, a shaft driven by the second power member, a stirring member on said shaft, a bell crank device capable of throwing the second power member into and out of engagement with the first power member, a cover for a receptacle whose contents is to be stirred inclosing and slidable lengthwise of said shaft, a connection between said cover member and said bell crank mechanism adapted, as the cover is moved, to throw the second power member into and out of engagement with the first, and mechanism by which the parts when manually unrestrained automatically move to such position that the second power member is out of engagement with the first.

4. In mechanism of the class described, a continuously rotating power member located at a point considerably above the position of the operator, a vertical casing extending downward from said power member, a shaft journaled within said vertical casing, a power transmitting member on said shaft engageable with the first power member, means for rocking said casing with the shaft inside of it between two positions; in one of which the power transmitting member is in engagement with the first and the other in which it is not, mechanism at the lower end of said shaft carrying a vertical stirring member, a cover member inclosing and slidable upon the mechanism which carries the stirring member, and means connecting the cover member to the rocking mechanism so arranged that the unrestrained weight of the cover normally throws the second power member out of engagement with the first, for the purposes set forth.

5. In mechanism of the class described, in combination with a suitable support, a bell crank member pivoted thereto, a vertically depending case member attached to one arm of the bell crank and movable thereby from side to side, a vertically slidable receptacle cover located adjacent to the lower end of said case member, a connecting rod between said cover and the second end of the bell crank, whereby vertical reciprocation of the cover swings the upper end of the tube backward and forward.

6. In mechanism of the class described, in combination with a suitable support, a bell crank member pivoted thereto, a vertically depending case member attached to one arm of the bell crank and movable thereby from side to side, a vertically slidable receptacle cover located adjacent to the lower end of said case member, a connecting rod between said cover and the second end of the bell crank, whereby vertical reciprocation of the cover swings the upper end of the tube backward and forward, adjustable means for varying the relationship of the second bell crank arm and the connecting rod, for the purposes set forth.

7. In mechanism of the class described, a table member, a bell crank pivoted to the table, a vertical casing member pivoted near its upper end to one arm of the bell crank for movement by the bell crank transversely to the axis of the casing member, a collar 38 near the lower portion of the casing member, and a support member 36 pivoted at one end to the collar member and secured at the other end to the table member, whereby movement of the bell crank may rock said tube backward and forward between two positions, for the purposes set forth.

8. In mechanism of the class described, a vertically mounted tubular casing, means pivoting the tubular casing near its bottom for slight movement about a horizontal axis, mechanism adjacent to the upper end of the casing for selectively moving it backward and forward about said axis, a rotatable shaft journaled in said casing member, a stirring tool driven from the lower end of said shaft, a cover for a receptacle slidable vertically of the axis of the shaft at a point adjacent to the stirring member, means detachably connecting the cover member to the means for rocking the upper end of the casing member, whereby moving the cover member between two different positions correspondingly moves the upper end of the casing member and the contained shaft, means on the upper end of said shaft adapted for selective engagement with a source of power, and such a source of power so located adjacent thereto whereby in one position of the cover member the vertical shaft with stirring tool attached is rotated while in the other it is not.

In witness whereof I have hereunto subscribed my name in the presence of two witnesses.

JOHN GRAVES.

Witnesses:
D. E. WYRE,
O. J. PEDERSON.